United States Patent [19]

Charns et al.

[11] Patent Number: 5,393,092
[45] Date of Patent: Feb. 28, 1995

[54] AIR BAG FOR A VEHICLE AIR BAG ASSEMBLY AND METHOD OF MAKING THE SAME

[75] Inventors: Stuart Charns, Gilbert, Ariz.; Bruce R. Hill, Farmington Hills, Mich.

[73] Assignee: TRW Inc., Lyndhurst, Ohio

[21] Appl. No.: 833,083

[22] Filed: Feb. 10, 1992

[51] Int. Cl.⁶ .............................................. B60R 22/16
[52] U.S. Cl. ............................ 280/743 R; 280/728 R
[58] Field of Search ........... 280/728 R, 743 R, 743 A, 280/731

[56] References Cited

U.S. PATENT DOCUMENTS

| | | |
|---|---|---|
| 985,829 | 3/1911 | Nickerson . |
| 2,052,630 | 9/1936 | Hoskwith . |
| 2,654,105 | 10/1953 | Roske . |
| 3,509,790 | 5/1970 | Hoppe . |
| 4,902,036 | 2/1990 | Zander et al. . |
| 4,988,118 | 1/1991 | Good et al. . |
| 5,010,663 | 4/1991 | Thornton et al. ............... 280/728 R |
| 5,033,771 | 7/1991 | Miyauchi et al. ............... 280/728 R |
| 5,094,477 | 3/1992 | Togawa ...................... 280/72 BA X |
| 5,180,188 | 1/1993 | Frantz et al. ................. 280/743 R X |
| 5,215,795 | 6/1993 | Matsumoto et al. ........... 280/728 X |
| 5,226,671 | 7/1993 | Hill .................................. 280/743 R |
| 5,280,954 | 1/1994 | Henseler et al. ................ 280/743 R |

FOREIGN PATENT DOCUMENTS

| | | |
|---|---|---|
| 4243645 | 8/1972 | Japan ..................................... 280/728 |
| 4189643 | 7/1992 | Japan ..................................... 280/728 |

OTHER PUBLICATIONS

Application Ser. No. 07/779,536, filed Oct. 17, 1991 "Air Bag Structure and Method of Forming" by Bruce R. Hill (inventor) pp. 1-25 (plus 7 sheets drugs).

*Primary Examiner*—Joseph Pape
*Attorney, Agent, or Firm*—Calfee Halter & Griswold

[57] ABSTRACT

A method of making air bags for vehicle air bag assemblies includes the step of forming a set of air bag panels. The set of panels includes a first panel with a perimetric edge and a second panel with a perimetric edge having an undulant fray-inhibiting contour. These panels are joined together to form a structure capable of being inflated to a predetermined three-dimensional configuration. Specifically, the perimetric edge of the first panel is joined to the perimetric edge of the second panel. Preferably, a plurality of second panels are die-cut with a die-board including a series of knives. Each knife has a shape corresponding to the desired shape of the second panel and the desired undulant fray-inhibiting contour of the panel's perimetric edge. The present invention also provides an air bag for a vehicle air bag assembly which includes a set of panels joined together to form a structure capable of being inflated into a three-dimensional shape. The set of air bag panels includes a first panel with a perimetric edge and a second panel with a perimetric edge having an undulant fray-inhibiting contour.

30 Claims, 11 Drawing Sheets

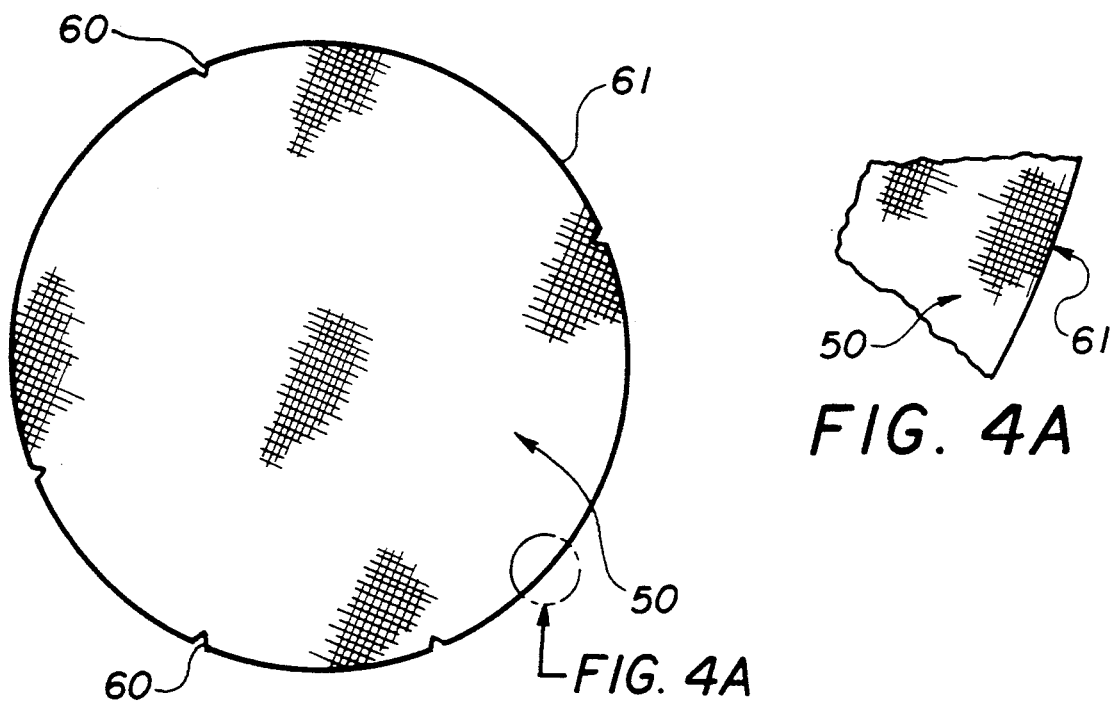
FIG. 3A
FIG. 4A
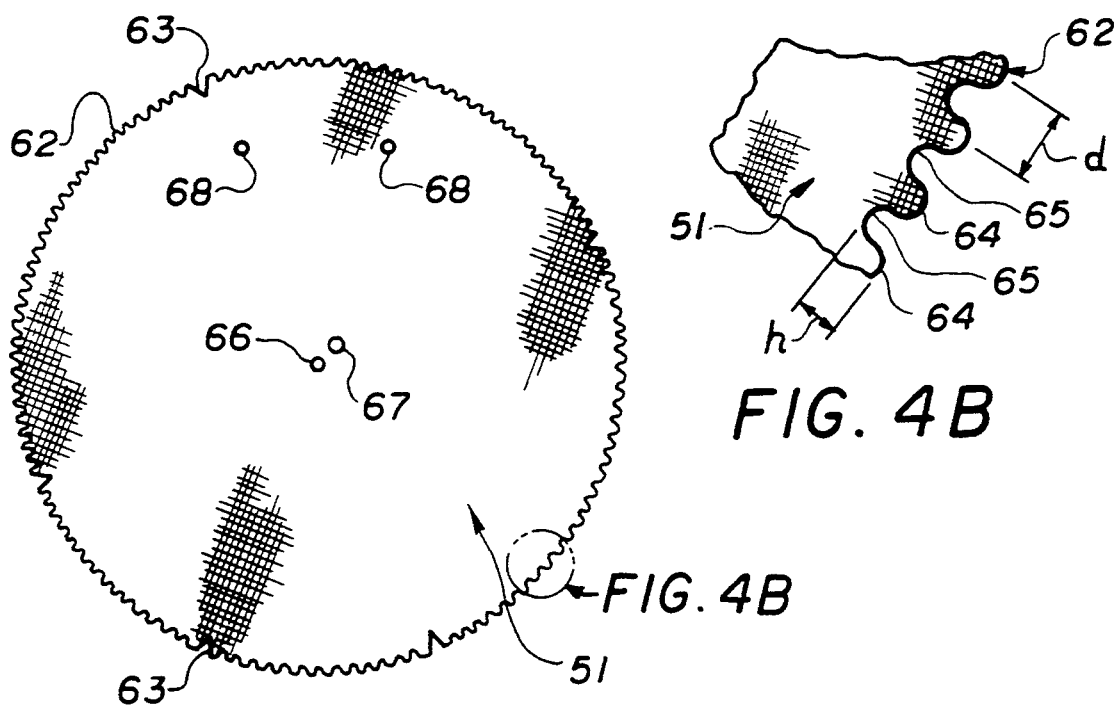
FIG. 3B
FIG. 4B

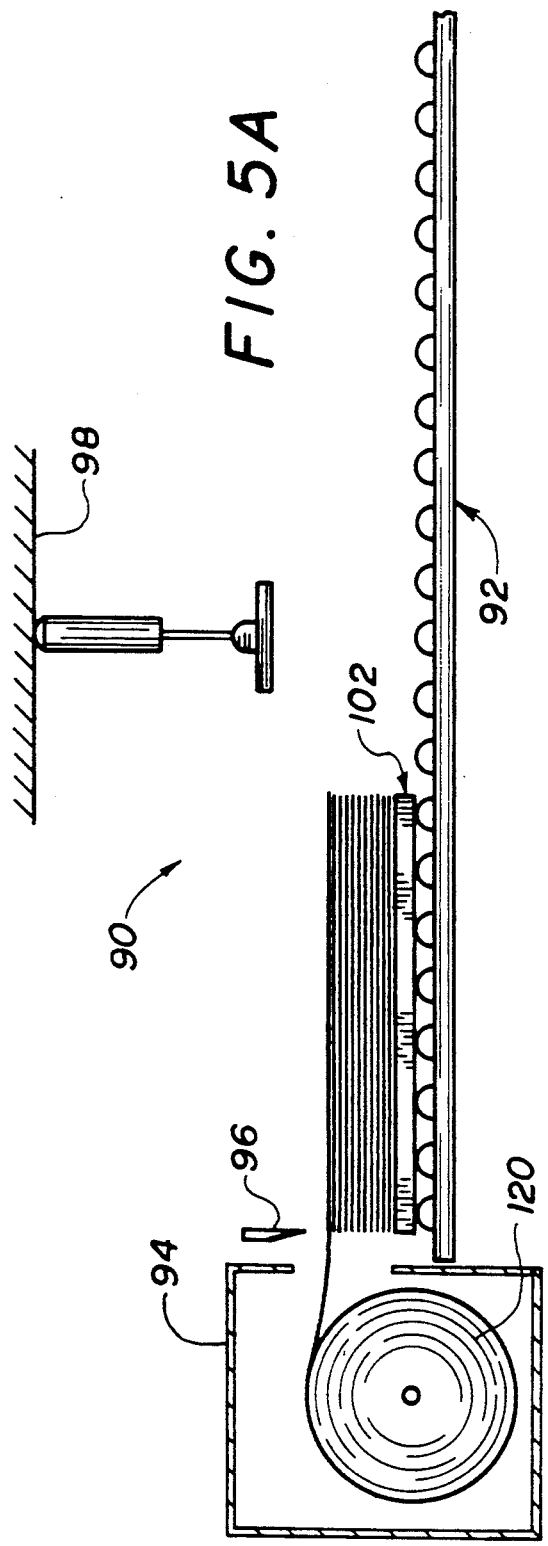
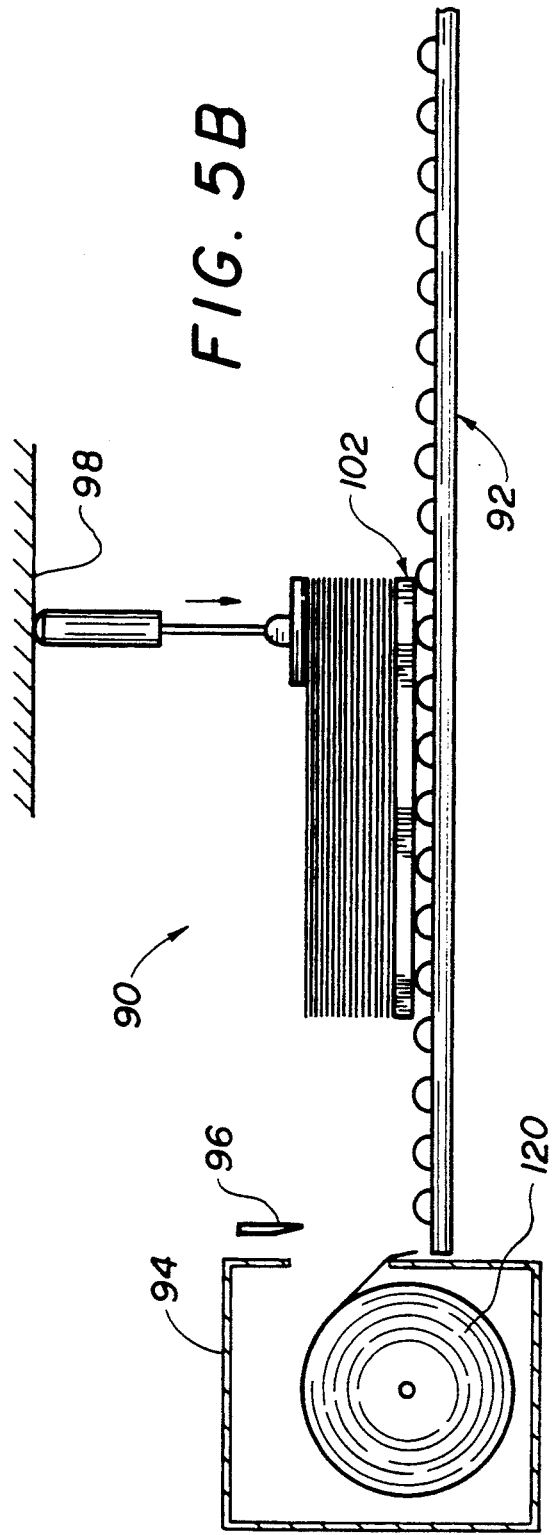

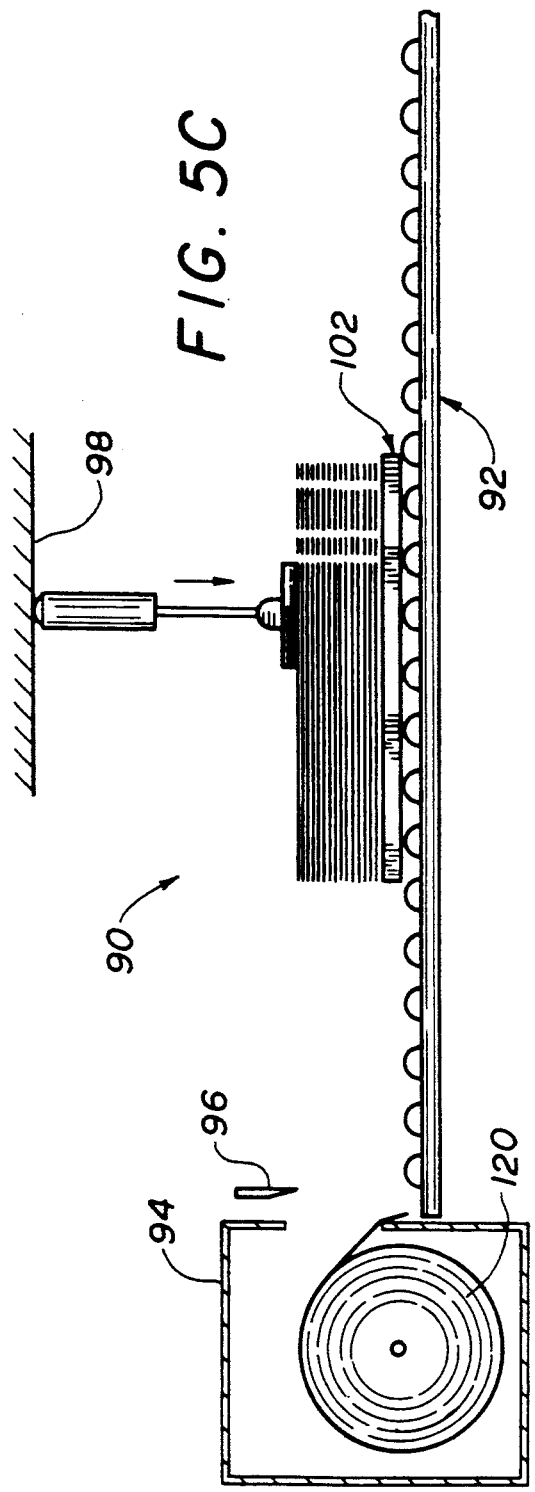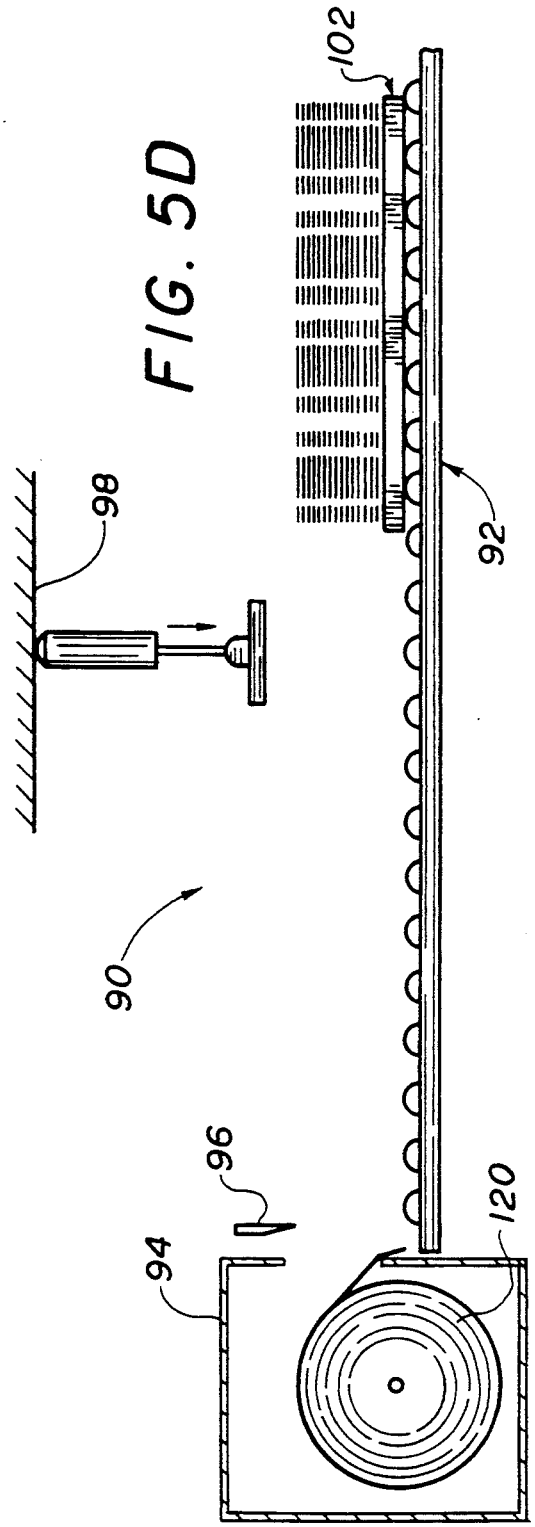

AIR BAG FOR A VEHICLE AIR BAG ASSEMBLY AND METHOD OF MAKING THE SAME

FIELD OF THE INVENTION

This invention relates to an air bag for a vehicle air bag assembly and a method of making the same.

BACKGROUND AND SUMMARY OF THE INVENTION

A vehicle air bag assembly functions to protect a vehicle occupant during a crash or collision. A typical vehicle air bag assembly comprises a container, an inflatable air bag disposed in the container, and an inflator in proximity to the inflatable air bag. At the onset of a collision, the inflator is actuated and rapidly directs an inert, non-toxic fluid, such as nitrogen gas, into the air bag. The fluid forces the air bag out of the container and rapidly inflates the air bag into a predetermined three-dimensional configuration. On the driver side of a vehicle, an air bag assembly is commonly incorporated into the vehicle steering wheel and the predetermined configuration of the air bag will usually approximate the shape of an ellipsoid.

A method of making an air bag will generally include the step of forming a set of air bag panels and joining these panels together to form a structure capable of being inflated to a three-dimensional configuration. For example, a driver side air bag is commonly made by forming front and rear circular panels and joining these panels together around their circumferential (or perimetric) edges. The front panel forms an occupant impact area when the air bag is expanded to its predetermined configuration. The rear panel includes a mouth which defines an inflation fluid inlet opening and which may be attached to the container and/or the inflator. Other panels may also be appropriately incorporated into the air bag, such as vent reinforcement panels, mouth reinforcement panels, heat shield panels, and/or strap panels.

A plurality of sets of air bag panels may be efficiently formed with a die-cutting system. A typical die-cutting system includes a conveying assembly, a fabric dispensing assembly, and a press assembly, all of which coordinate with one or more die boards to form the air bag panels. For example, to form a plurality of sets of driver side air bag panels, a first die board and a second die board would be provided. The first die board would include a plurality (typically ten or more) of straight edge knives, each corresponding to the desired shape of the front panel. ("Straight" in this context corresponds to a contour which is non-undulant rather than strictly linear. Thus, the overall geometry of a straight edge knife could be circular.) The second die board would include an equal number of circular straight edge knives, each corresponding to the desired shape of the rear panel. These die boards sometimes also include additional straight edge knives for forming other air bag panels, such as vent reinforcement panels, mouth reinforcement panels, and/or heat shield panels.

To form the air bag panels, a roll of fabric is loaded onto the fabric dispensing assembly and a die board is appropriately placed onto the conveying assembly. The fabric dispensing assembly then loads a desired number of layers of the fabric (typically fifteen or more) onto the die board. Thereafter, the conveying assembly and the press assembly coordinate to apply pressure on the fabric layers to die-cut the air bag panels. The panels are then unloaded from the die board and transported to a location where subsequent assembly steps may be performed.

One may appreciate that such a die-cutting system can be used to mass-produce air bag panels efficiently. For example, if a die board includes ten rear panel knives and fifteen layers of fabric are loaded onto the die board, one hundred-fifty rear air bag panels may be simultaneously produced. Thus, producing air bag panels with a die-cutting system can be very advantageous from a production time standpoint. Moreover, many air bag manufacturers have invested in, and their facilities are designed to accommodate, such die-cutting systems.

In the past, air bags panels have usually been formed from a woven synthetic fabric, such as nylon, which is coated with a material such as neoprene. With particular reference to a driver side air bag, both the front panel and the rear panel have been formed from such a coated fabric. The coated fabric insures that the air bag panels formed from the fabric will be resistant to heat and will be essentially impermeable by fluids and/or particles released or produced during the inflation process. Additionally, the coated fabric inhibits the fraying of the straight edges of the air bag panels. Such fraying is undesirable because it could negatively affect the structural integrity of the air bag and/or complicate intermediate assembly steps.

Applicants believe that a driver's side air bag may include a rear panel in which the heat resistance and the fluid impermeability qualities of a coated fabric are not necessary. Consequently, applicants believe that an uncoated fabric could be used to form this rear panel. Because uncoated fabrics are generally less expensive than coated fabrics, the use of an uncoated fabric to form the rear panel would reduce the cost of the air bag. However, applicants also appreciate that the rear panels produced in existing die-cutting systems have circumferential (or perimetric) edges which have straight contours. Applicants believe that if the rear panels were formed from uncoated fabric in these die-cutting systems, their straight edges would have a tendency to fray during subsequent assembly steps and/or in the completed air bag. Accordingly, applicants believe that the use of a coated fabric is still necessary to form rear air bag panels with conventional die-cutting systems.

Applicants believe that a laser-cutting system could possibly be used to form rear air bag panels from an uncoated fabric because a laser-cutting system would heat seal the edges of the panels during the cutting process. This heat sealing would minimize the tendency of the circumferential edge of the rear panel to fray. However, the capital investment for a laser cutting system is quite significant and would require the replacement or abandonment of existing die-cutting equipment. Additionally, only five or six panels may be produced at a time with most laser cutting systems thereby making them uncompetitive, from a production time standpoint, with conventional die-cutting systems.

The present invention provides a method of making air bags which allows at least some of the air bag panels to be formed from uncoated fabrics. The method is competitive with conventional die-cutting techniques from a production time standpoint and does not require a significant capital investment in machinery. In the preferred embodiment, the method is used to form certain panels for a driver side air bag. However, the invention may also be applicable to the manufacture of certain passenger side air bag panels. Moreover, as uncoated fabrics with sufficient heat resistance and fluid impermeability qualities are developed, the method may be used to produce any or all of the panels in both driver side and passenger side air bags.

More particularly, the present invention provides a method of making air bags for vehicle air bag assemblies. The method comprises the step of forming a set of air bag panels which includes a first panel with a perimetric edge and a second panel with a perimetric edge having an undulant fray-inhibiting contour. The air bag panels are joined together to form a structure capable of being inflated to a predetermined three-dimensional configuration. Specifically, the perimetric edges of the first and second panels are joined together. The fray-inhibiting contour of the second panel's perimetric edge, which is preferably a pinked contour, prevents the fraying of this edge. In this manner, the second panel may be formed from an uncoated fabric without affecting the structural integrity of the air bag and/or complicating intermediate assembly steps.

Preferably, a plurality of second panels are simultaneously formed by die-cutting them with a specially designed die-board. The die board includes a series of knives, each of which has a shape corresponding to the desired shape of the second panels and the desired undulant fray-inhibiting contour. Consequently, the present method may be practiced with existing die-cutting systems simply by providing an appropriate die board. Additionally, the production rate of this method will be approximately the same as the production rate of conventional die-cutting techniques.

The present invention also provides an air bag for a vehicle air bag assembly which includes a set of panels joined together to form a structure capable of being inflated into a predetermined three-dimensional configuration. The set of air bag panels includes a first panel with a perimetric edge and a second panel with a perimetric edge having an undulant fray-inhibiting contour. The perimetric edges of these first and second panels are joined together. Preferably, the air bag is for a driver side air bag assembly and the predetermined configuration is an ellipsoid shape. In this preferred embodiment, the set of panels includes a circular front panel which is made from a coated fabric and a circular rear panel which is made from an uncoated fabric and which has a circumferential edge having an undulant fray-inhibiting contour.

BRIEF DESCRIPTION OF THE DRAWINGS

In the annexed drawings:

FIGS. 3A-3H are top views of a set of air bag panels which are joined together to form the air bag;

FIGS. 4A-4B are enlarged views of the circumferential edges of the air panels shown in FIGS. 3A and 3B, respectively;

FIGS. 5A-5D are schematic illustrations of a die-cutting system used to form the air bag panels shown in FIGS. 3A-3F;

FIG. 7 is a top view of a second die board for use the die-cutting system shown in FIGS. 5A-5D;

DETAILED DESCRIPTION

Figure 1:
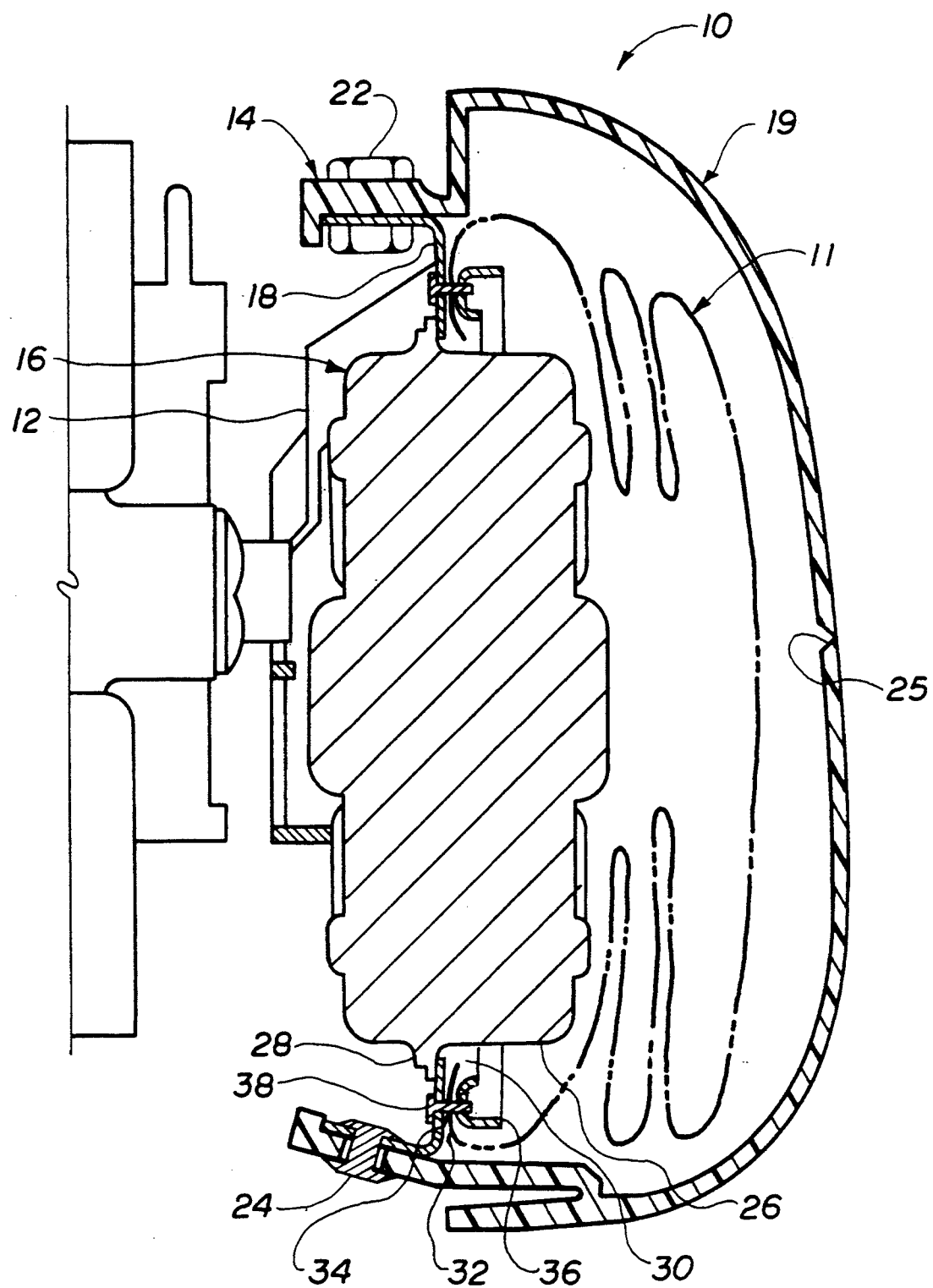
FIG. 1 is a sectional view of an air bag assembly which incorporates an air bag made according to the present invention.

Referring now to the drawings in detail, and initially to FIG. 1, an air bag assembly 10 is shown which incorporates an air bag 11 according to the present invention. The illustrated air bag assembly 10 is a driver side air bag assembly and is designed to be incorporated as a unit into a vehicle steering wheel. The steering wheel includes a cup-shaped base member 12 which is fixed to and rotatable with the vehicle steering shaft. The incorporation of the air bag assembly 10 into the vehicle steering wheel specifically includes loading the air bag assembly 10 into the cup-shaped base member 12.

The air bag assembly 10 further includes a container 14 and an inflator 16. The container 14 comprises a reaction plate 18 and a cover 19 attached thereto by a suitable fastening structure, such as bolts 22 and rivets 24. As is explained in more detail below, the air bag 11 and the inflator 16 are also coupled to the reaction plate 18. Although not specifically shown in the drawings, the reaction plate 18 is also coupled, via the vehicle steering column, to a structural part of the vehicle.

Figure 2:
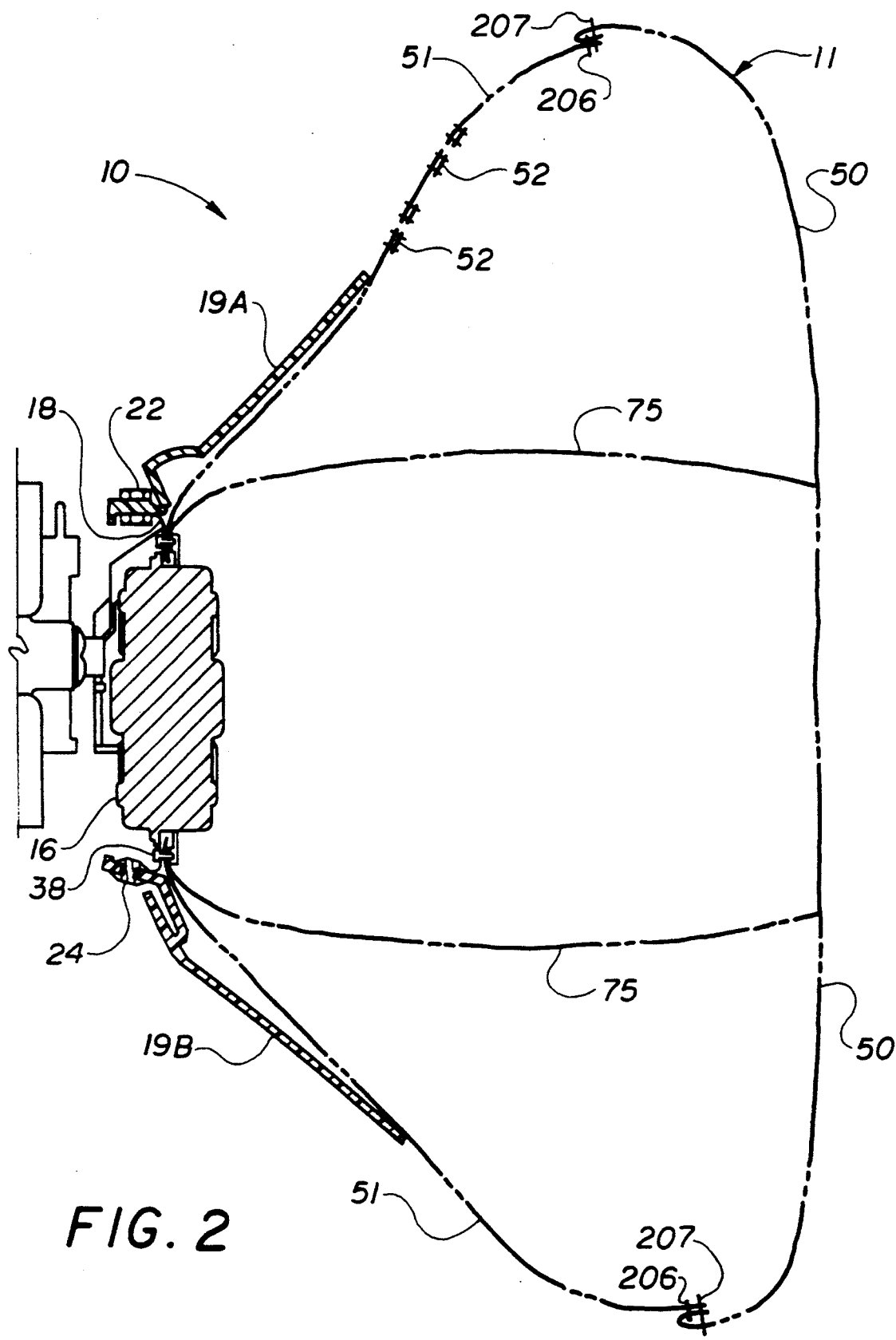
FIG. 2 is a schematic view of the air bag assembly of FIG. 1, with the air bag inflated to its predetermined configuration.

The reaction plate 18 and the cover 19 define a receptacle in which the air bag 11 is stored in a collapsed, folded condition. The cover 19 is formed of a tough, flexible plastic such as urethane or a thermoplastic polyolefin (TPO) elastomer. The inside of the cover 19 has a designed weakness in the form of a V-shaped groove 25 which enables the cover 19 to separate into segments 19A and 19B as the air bag 11 is deployed. (See FIG. 2.)

The inflator 16 can be any of a number of known constructions, including the preferred construction disclosed in U.S. Pat. No. 4,902,036. In this preferred construction, the inflator 16 has a generally disc-like shape with an annular gas dispensing portion 26 which includes an array of gas dispensing nozzles (not shown). A peripheral flange 28 of the inflator 16 is coupled to the reaction plate 18 by rivets (not shown).

The air bag 11 includes a mouth 32 which defines an inflation fluid inlet opening 30 and which includes mounting holes 34. The air bag 11 is preferably formed as a complete subassembly, folded into a collapsed condition, and then fastened to the reaction plate 18. In the illustrated embodiment, this fastening is accomplished by placing the air bag mouth 32 between the reaction plate 18 and a retaining ring 36. Rivets 38 are inserted through the mounting holes 34 in the air bag mouth 32 and corresponding holes in the reaction plate 18 and the retaining ring 36.

At the onset of a vehicle collision, the inflator 16 is actuated and rapidly discharges an inert, non-toxic gas, such as nitrogen, through its nozzles. The gas is directed through the fluid inlet opening 30 of the air bag 11 and into an interior cavity defined by the air bag 11. As the gas begins to inflate the air bag 11, pressure is applied to the cover 19 which forces the air bag 11 through the cover 19. The air bag is then inflated to a predetermined configuration, which in the illustrated embodiment approximates the shape of an ellipsoid. (See FIG. 2.)

Figure 3C:
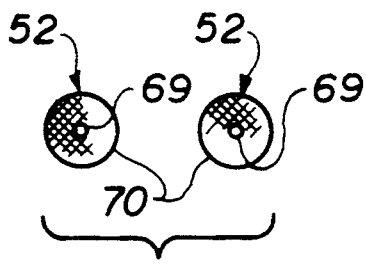
Figure 3D:
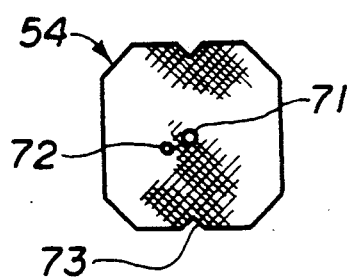
Figure 3E:
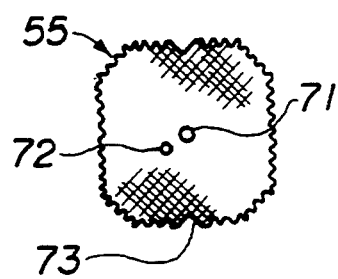
Figure 3F:
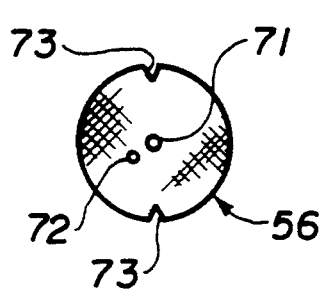
Figure 3H:
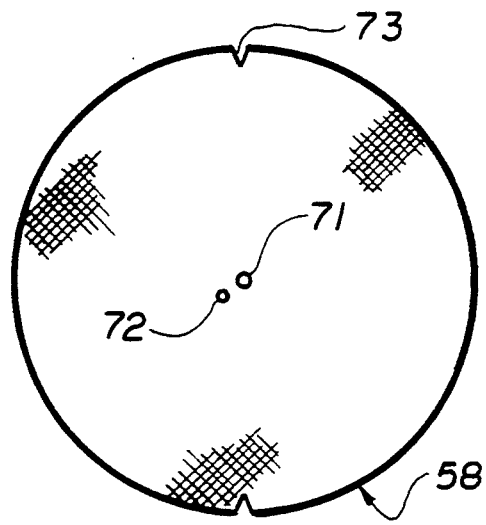
Figure 3G:
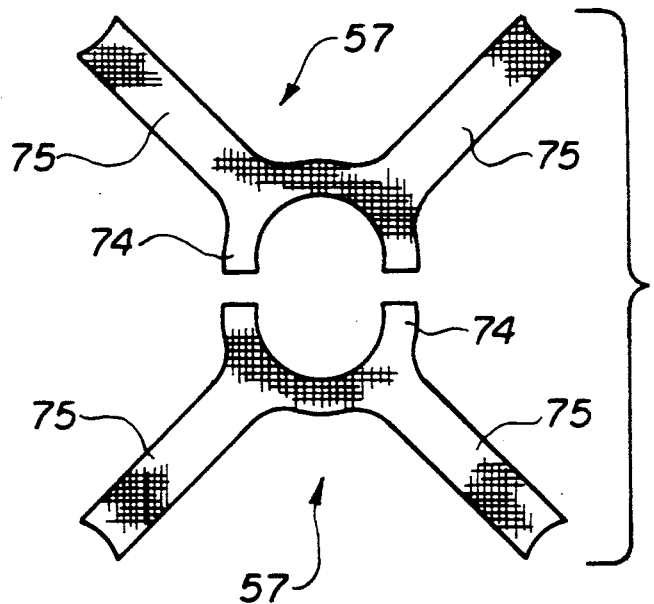

The method of making the air bag 11 according to the present invention generally includes the steps of forming a set of air bag panels and then joining these panels together to form a structure capable of being inflated to a three-dimensional configuration. In the illustrated and preferred embodiment, the set of air bag panels includes: a front panel 50 (FIG. 3A), a rear panel 51 (FIG. 3B), two vent reinforcement panels 52 (FIG. 3C), a first mouth reinforcement panel 54 (FIG. 3D), a second mouth reinforcement panel 55 (FIG. 3E), a third mouth reinforcement panel 56 (FIG. 3F), a pair of strap panels 57 (FIG. 3G), and a heat shield panel 58 (FIG. 3H). As is explained in more detail below, the formation of these panels is accomplished in such a manner that certain panels, namely the rear panel 51 and the second mouth reinforcement panel 55, may be formed from a relatively inexpensive uncoated fabric.

The front panel 50 (FIG. 3A) is circular in shape and is formed from a woven synthetic material, such as nylon. An inner surface of the front panel 50, or the surface which will face the interior of the air bag 11, is preferably coated with a heat resistant material, such as neoprene which is a synthetic rubber. Alternatively, the outer surface, or both the outer and inner surfaces, of the air bag 11 may be coated with such a heat resistant material. With the exception of alignment notches 60, the front panel's circumferential (or perimetric) edge 61 follows a straight contour. (See FIG. 4A.)

The rear panel 51 (FIG. 3B) is also circular in shape and is also formed from a woven synthetic material, such as nylon. However, both surfaces of the rear panel 51 are preferably left uncoated. Additionally, while the rear panel's circumferential edge 62 also includes alignment notches 63, the edge follows an undulant fray-inhibiting contour which discourages the fraying of the fabric. In this manner, a more economic uncoated fabric may be used for the rear panel, thereby decreasing the overall cost of the air bag 11.

The fray-inhibiting contour is preferably a "pinked" contour or, more particularly, a "zigzag" pattern of substantially small curved "mountains" 64 separated by curved valleys 65 of essentially the same size. (See FIG. 4B.) Although the relative size of the pinked contour has been exaggerated somewhat in FIG. 3B for the purposes of explanation, the height h of each "mountain" would preferably be in the range of one to three millimeters and the "peak-to-peak" distance d between adjacent mountains would preferably be in the range of four to seven millimeters. More preferably, the height h would be approximately equal to two millimeters, and the peak-to-peak distance d would be approximately equal to five millimeters. A typical radius of curvature for each mountain/valley would be two millimeters. (In comparison, the notches 63 would typically be right triangular indentations approximately seven millimeters deep.)

While in the illustrated example the pinked contour includes curved mountains 64 and valleys 65, a contour including triangular mountains and/or valleys would also be considered a pinked contour for the purposes of the present application. Additionally, although all of the mountains 64 forming the illustrated pinked contour are essentially the same size, a contour including variable sized mountains would also be considered a pinked contour.

The rear panel 51 additionally includes two centrally located alignment openings 66 and 67, one of the openings preferably being of a different size and/or shape than the other opening. These alignment openings 66 and 67 are used in the formation of the fluid inlet opening 30 and the mouth 32, as is explained in more detail below. The rear panel 51 also includes two vent openings 68 which enable the air bag 11 to be deflated in a controlled fashion when it is struck by a vehicle occupant. In the illustrated embodiment, these vent openings 68 will be positioned in an upper rear portion of the air bag 11 when it is in an inflated condition. (See FIG. 2.)

The vent reinforcement panels 52 (FIG. 3C) are designed to prevent tearing or other damage to the air bag material surrounding the vent openings 68 during inflation. To this end, the vent reinforcement panels 52 are each circular in shape, and each includes a central vent opening 69 corresponding to one of the vent openings 68 in the rear panel 51. The vent reinforcement panels 52 are preferably made of the same coated fabric as the front panel 50 and their circumferential edges 70 have a straight contour. Although alignment notches may be provided if desired, they are generally not necessary in the vent reinforcement panels 66 due to the central location of the vent opening 69.

The mouth reinforcement panels 54, 55 and 56 (FIGS. 3D, 3E and 3F) and the heat shield panel 58 are designed to protect the air bag 11 from damage due to mechanical and heat stresses imposed during the inflation process. More particularly, these panels structurally reinforce and thermally protect the air bag mouth 32, particularly in the area of the mounting holes 34. As is best seen by referring briefly back to FIGS. 1 and 2, this portion of the air bag 11 is the most susceptible to damage because it is most proximate to the gas discharging portion 26 of the inflator 16 and because it includes the mounting holes 34.

The mouth reinforcement panels 54 and 55 are both essentially in the shape of a square having "cut-off" corners. The third mouth reinforcement panel 56 is essentially in the shape of a circle. Preferably the first mouth reinforcement panel 54 and the third mouth reinforcement panel 56 are made of the same coated fabric as the front panel 50 and their perimetric/circumferential edges follow a straight contour. The second mouth reinforcement panel 55 is preferably made of the same uncoated fabric as the rear panel 51 and its perimetric edge includes the same undulant fray-inhibiting contour as the rear panel's circumferential edge 62.

The heat shield panel 58 is in the shape of a circle with a diameter larger than the diameter of the third reinforcement panel 56 and the width and/or length of the first and second reinforcement panels 54 and 55. The heat shield panel 58 is adapted to provide primarily heat resistance, as opposed to the reinforcement panels 54, 55, and 56 which provide both reinforcement and heat resistance. To this end, the heat shield panel may be made of a thin nylon fabric coated on both side with neoprene. Alternatively, the heat shield panel 58 may be formed of another heat resistant material such as Nomex® or Kevlar®. (Nomex® and Kevlar® are registered trademarks of the E.I. Dupont de Nemours & Company for aramid fabrics and both are relatively strong flame retardant materials known for their heat resistivity.)

Each of the panels 54, 55, 56 and 58 includes a pair of alignment openings 71 and 72 which are of a similar shape and orientation as the alignment openings 66 and 67 of the rear panel 51. To help align the various panels 54, 55, 56, 58 and 51, the alignment openings 71 and 72 must overlie with the alignment openings 66 and 67 of the rear panel 51 during the formation of the fluid inlet opening 30 and air bag mouth 32. The panels 54, 55 and 56 additionally each include a set of alignment notches 73. These notches also aid in the alignment of the panels during the formation of the fluid inlet opening 30 and the mouth 32.

Each of the strap panels 57 (FIG. 3G) includes a semi-annular base 74 and two straps 75 which project radially from the base 74 and which include slightly curved free ends. In the completed air bag assembly 10, the straps 75 will function to control the inflation pattern of the air bag 11. (See FIG. 2.) More particularly, the straps 75 encourage the front and rear panels 50 and 51 to bow outward relative to each other so that the air bag 11 will expand to its predetermined three dimensional configuration. The strap panels 57 are preferably formed of the same flexible material as either the front panel 50 or the rear panel 51. Other flexible materials may be used, however, if necessary or desired.

The preferred manner of forming the set of air bag panels includes the use of a die-cutting system, such as the die-cutting system 90 shown schematically in FIGS. 5A–5D. The die-cutting system 90 includes a conveying assembly 92, a fabric dispensing assembly 94 positioned adjacent an upstream end of the conveying assembly 92, and a fabric cutting assembly 96 positioned between the assemblies 92 and 94. The system 90 additionally includes a press assembly 98 which is positioned above an intermediate portion of the conveying assembly 92 and which is operable to selectively move vertically. The downstream end of the conveying assembly 92 functions as an unloading area for die-cut air bag panels.

Figures 6, 6A:
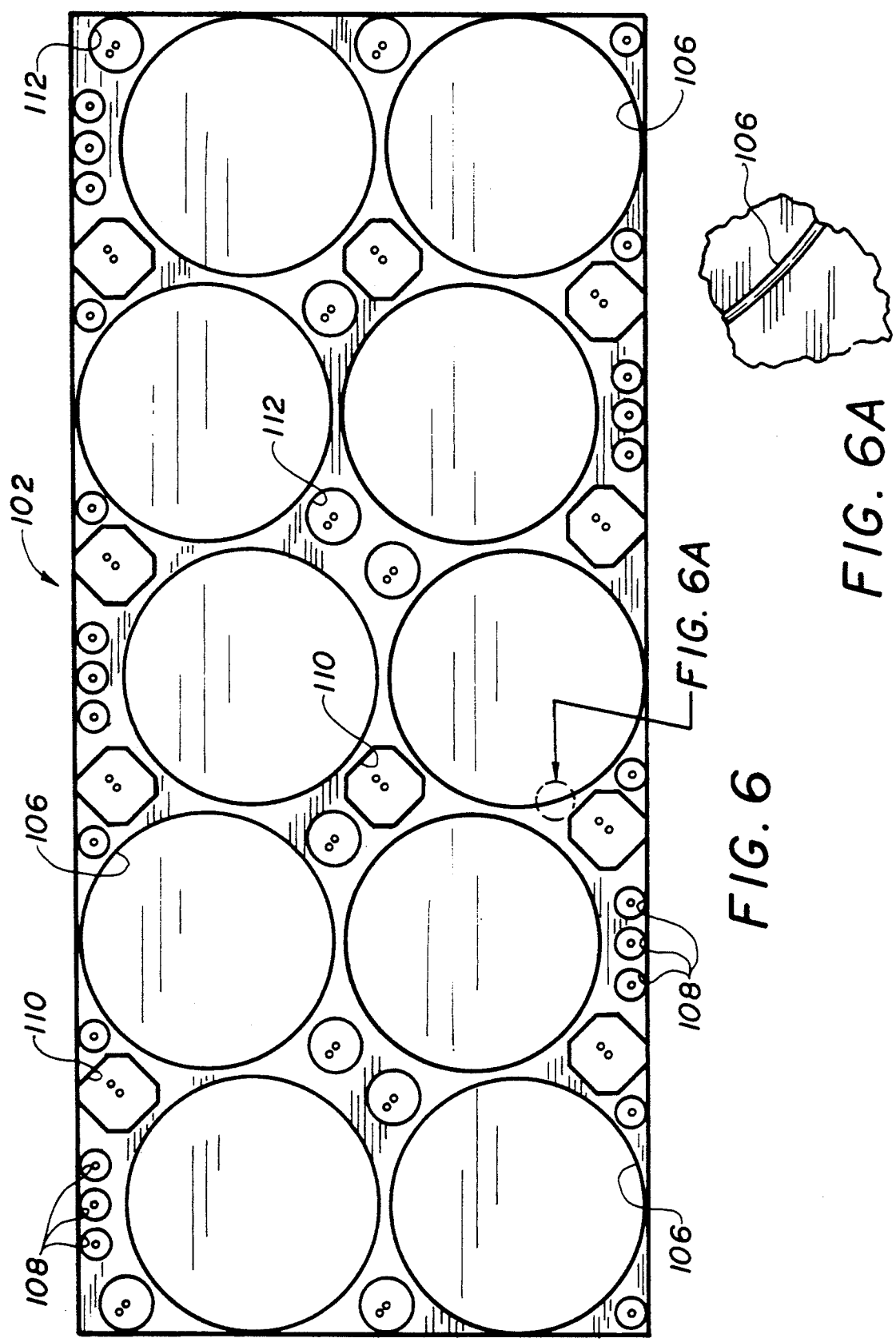
FIG. 6 is a top view of a first die board for use with the die-cutting system shown in FIGS. 5A-5D.
FIG. 6A is a enlarged view of a portion of the one of the knives on the first die board.

In the preferred embodiment, a first die board 102 (see FIG. 6) is used with the die-cutting system 90 to form ten front panels 50, twenty-four vent reinforcement panels 52, ten first mouth reinforcement panels 54, and ten third mouth reinforcement panels 56. To this end, the first die board 102 includes ten circular knives 106 corresponding to the desired geometry of the front panel 50, twenty-four circular knives 108 corresponding to the desired geometry of the vent reinforcement panels 52, ten square knives 110 corresponding to the desired geometry of the first mouth reinforcement panel 54, and ten circular knives 112 corresponding to the desired geometry of the third mouth reinforcement panel 56. These knives are designed to cut these panels in such a manner that their circumferential/perimetric edges follow a straight contour. (See FIG. 6A.) Preferably, each of the knives 106, 108, 110 and 112 is a two inch by six point rule.

To form the air bag panels 50, 52, 54, and 56, a roll of coated fabric 120 (See FIG. 5A) is loaded on the fabric dispensing assembly 94 and the first die board 102 is appropriately placed near the upstream end of the conveying assembly 92. A leading section of the fabric 120 is pulled from the roll over the first die board 102 and then cut from the remaining fabric on the roll by the fabric cutting assembly 96. This process is repeated until the desired number of layers of fabric are positioned over the die board 102.

The conveying assembly 92 is then activated to convey the first die board 102, and the layers of coated fabric laid out on the die board 102, to a position where a first section of the die board is positioned beneath the press assembly 98. The press assembly 98 applies pressure to the sections of the fabric layers on top of the first section of the die board to form air bag panels. (See FIG. 5B.) The conveying assembly 92 is then activated to convey the loaded die board 102 to a position where a second section of the die board is positioned beneath the press assembly 98. The press assembly 98 applies pressure to the sections of the fabric layers loaded on the second section of the die board to form air bag panels. (See FIG. 5C.) This procedure is repeated until all of the fabric layers loaded on the die board 102 have been die-cut. The conveying assembly 92 is activated to advance the die board 102, and the air bag panels situated on the die board, to the unloading area. (See FIG. 5D.) The panels are unloaded from the die board 102 and transported to a location where subsequent assembly steps may be performed.

Figure 7A:
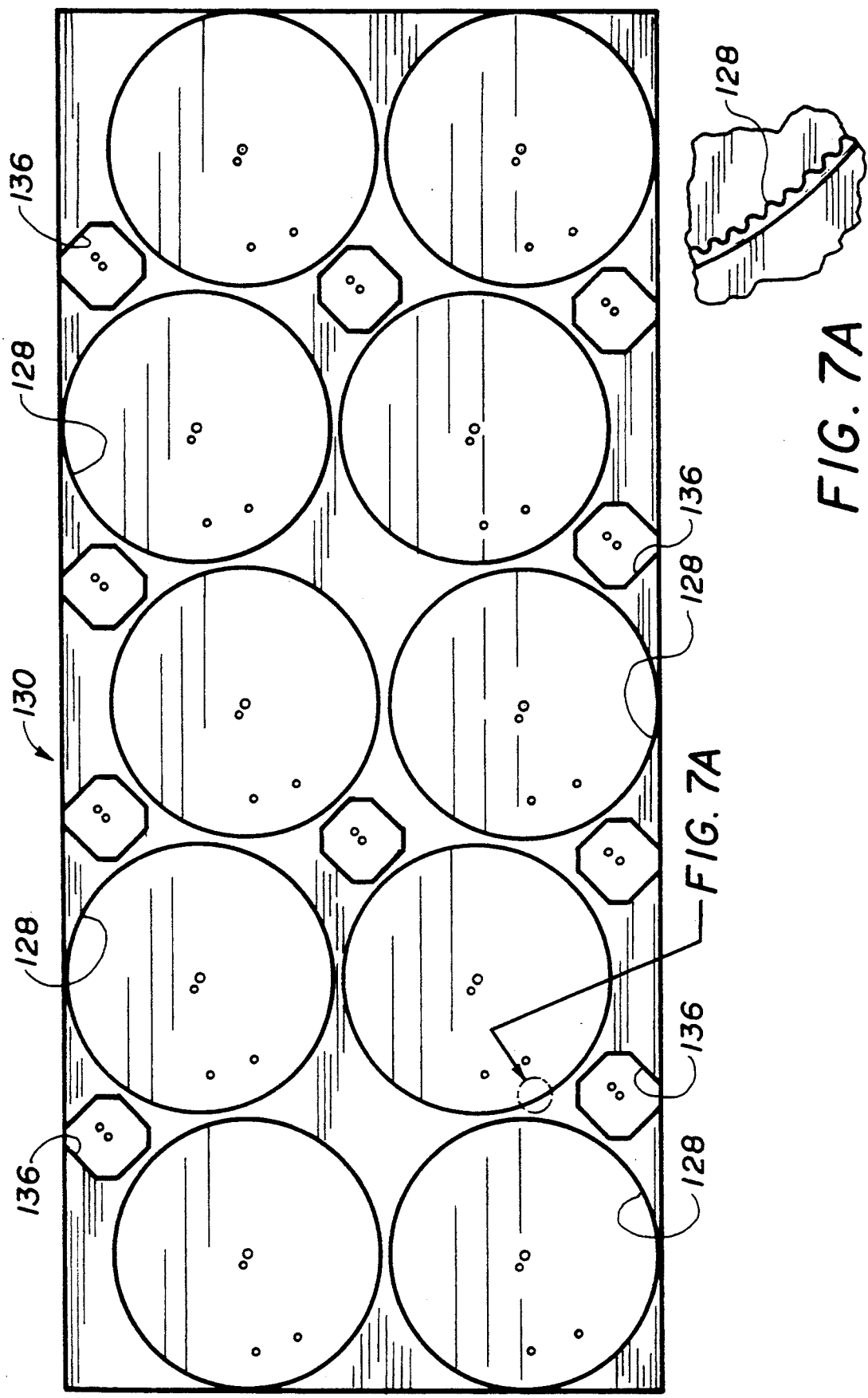
FIG. 7A is an enlarged view of a portion of the one of the knives on the second die board.

A second die board 130 (See FIG. 7) is used with the die-cutting system 90 to form ten rear panels 51 and ten second mouth reinforcement panels 55. The second die board 130 includes ten circular knives 128 corresponding to the desired geometry of the rear panel 51 and ten square knives 136 corresponding to the desired geometry of the second mouth reinforcement panel 55. These knives are designed to cut these panels in such a manner that their circumferential/perimetric edges follow an undulant fray-inhibiting contour, or more particularly, a pinked contour. (See FIG. 7A.) Preferably, each of the knives 128 and 136 is a one and a quarter inch by six point rule.

To form the air bag panels 51 and 55, a roll of uncoated fabric is loaded on the fabric dispensing assembly 94 and the second die board 130 is appropriately placed near the upstream end of the conveying assembly 92. The above-described die-cutting process is then repeated. Alternatively, a die-cutting system may be provided for each of the die boards 102 and 130 so that changing of fabric rolls would not be necessary. In either event, one may appreciate that the present invention may be practiced with existing die-cutting systems simply by replacing the current die board with a die board such as the die board 130. Thus, a significant capital investment in machinery is not necessary. Additionally, the present method is competitive with conventional die-cutting techniques from a production time standpoint. More specifically, if fifteen layers of fabric are laid out on the die board 130, one-hundred fifty rear air bag panels and one-hundred fifty second mouth reinforcement panels will be substantially simultaneously produced.

In the preferred embodiment, all of the air bag panels are formed with the die boards 102 and 130 except for the strap panels 57 and the heat shield panel 58. The strap panels 57 may be formed in a similar manner with a die board dedicated solely to this particular panel. Such an arrangement is preferred because the geometry of the strap panels 57 would cause an excessive waste of material if the corresponding knives were included in either of the die boards used to form the other air bag panels. The heat shield panel 58 is independently formed because it is made of a different fabric than the other panels of the air bag 11.

Figure 8A:
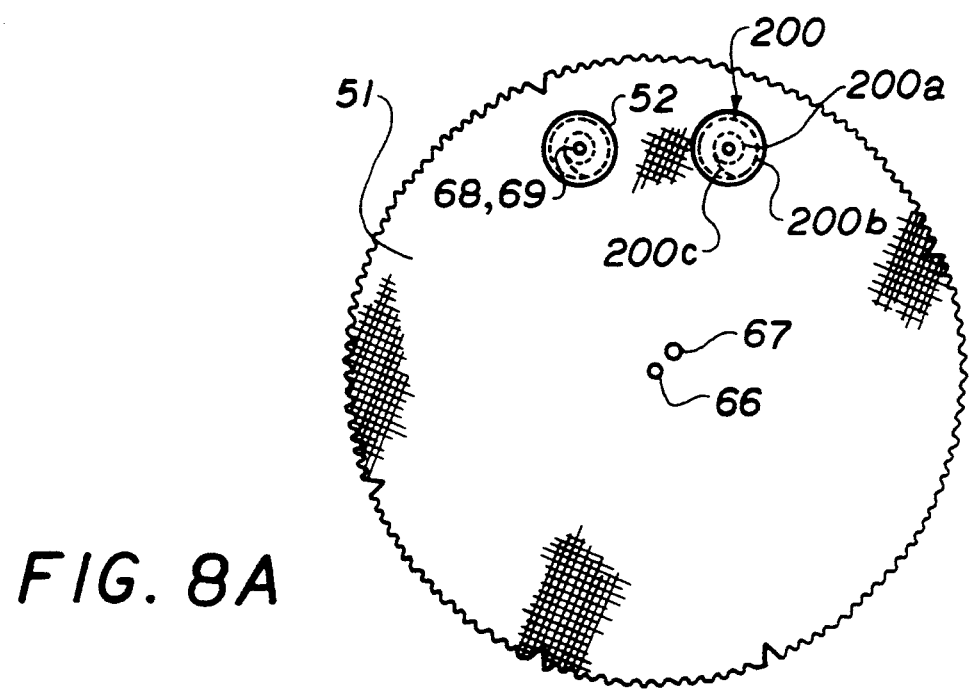
FIGS. 8A-8H are schematic illustrations of panel-joining and mouth-forming steps in the method of making an air bag according to the present invention.

After the air bag panels have been die-cut or otherwise formed, the panel-joining steps and the mouth-forming steps of the method may begin. (See FIG. 8A.) The preferred joining steps include initially attaching the vent reinforcement panels 52 to the rear panel 51 in such a manner that the vent openings 68 and 69 are aligned. In the illustrated embodiment, each of the vent reinforcement panels 52 is sewn to the rear panel 51 by a stitchline 200. The stitchline 200 includes a circular portion 200a surrounding the aligned vent openings 68 and 69, a circular portion 200b positioned slightly inward from the circumferential edge of the reinforcement panel 52, and a transition section 200c between the portions 200a and 200b. The panels 52 are preferably positioned so that their coated surfaces are adjacent the inner surface of the rear panel 51. The panels 52 could alternatively be attached to the rear panel's outer surface. Additionally, while the vent openings 68 and 69 are preferably die-cut in the panels 51 and 52, they could alternatively be punched in the panels either before or after their attachment together.

The reinforcement panels 54, 55 and 56 and the heat shield panel 58 are also joined to the rear panel 51 in preparation for the forming of the fluid inlet opening 30 and the air bag mouth 32. This joining step, and also the inlet opening and mouth forming steps, preferably follow those set forth in co-pending U.S. application Ser. No. 07/779,536 to Bruce R. Hill which was filed on Oct. 17, 1991. This co-pending application is entitled "Air Bag Structure and Method of Forming" and is assigned to the assignee of the present application.

Figure 8B:
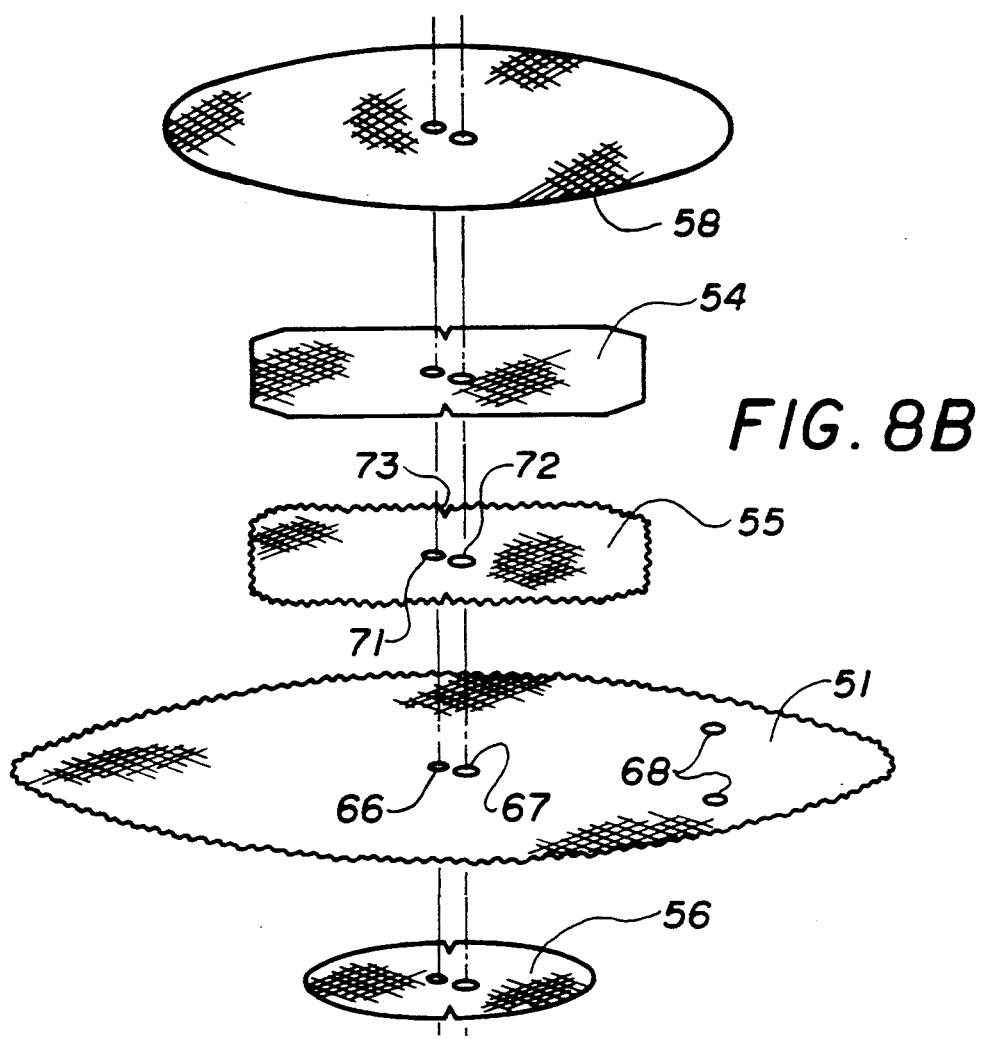
Figure 8C:
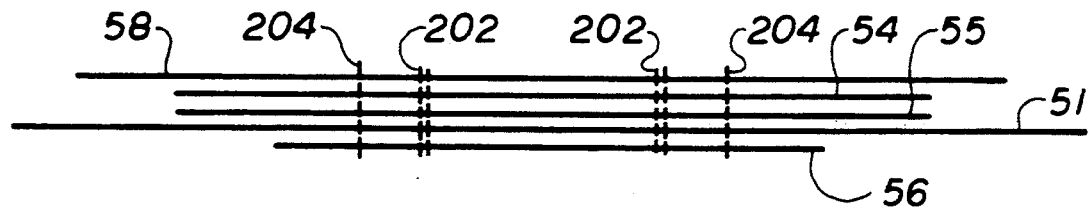

Specifically, the step of joining the reinforcement panels 54, 55 and 56 and the heat shield panel 58 to the rear panel 51 includes placing the third mouth reinforcement panel 56 (uncoated side up) over the inner surface of the rear panel 51. The second mouth reinforcement panel 55 is placed over the outer surface of the rear panel, the first mouth reinforcement panel 54 (coated side up) is placed over the second mouth reinforcement panel 55, and the heat shield panel 58 is placed over the first mouth reinforcement panel 54. (See FIG. 8B.) The alignment openings 66, 67, 71 and 72, and the alignment notches 73, are appropriately aligned to align the panels properly relative to each other. The five panels 51, 54, 55, 56 and 58 are then joined together in this arrangement by a pair of concentric stitchlines 202 and 204. (See FIG. 8C.) The stitchline 202 is preferably a double stitchline.

Figure 8D:
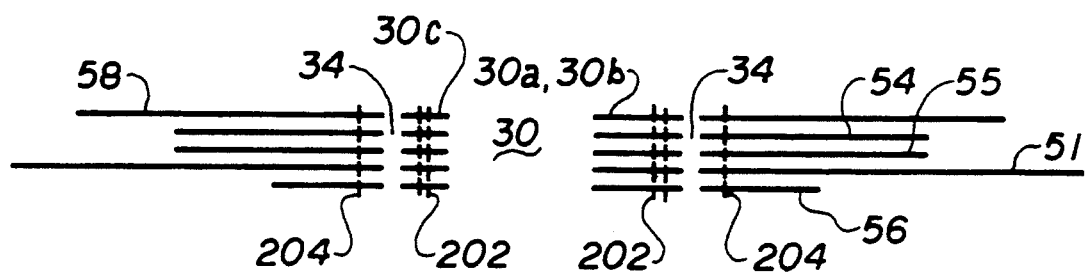
Figure 8E:
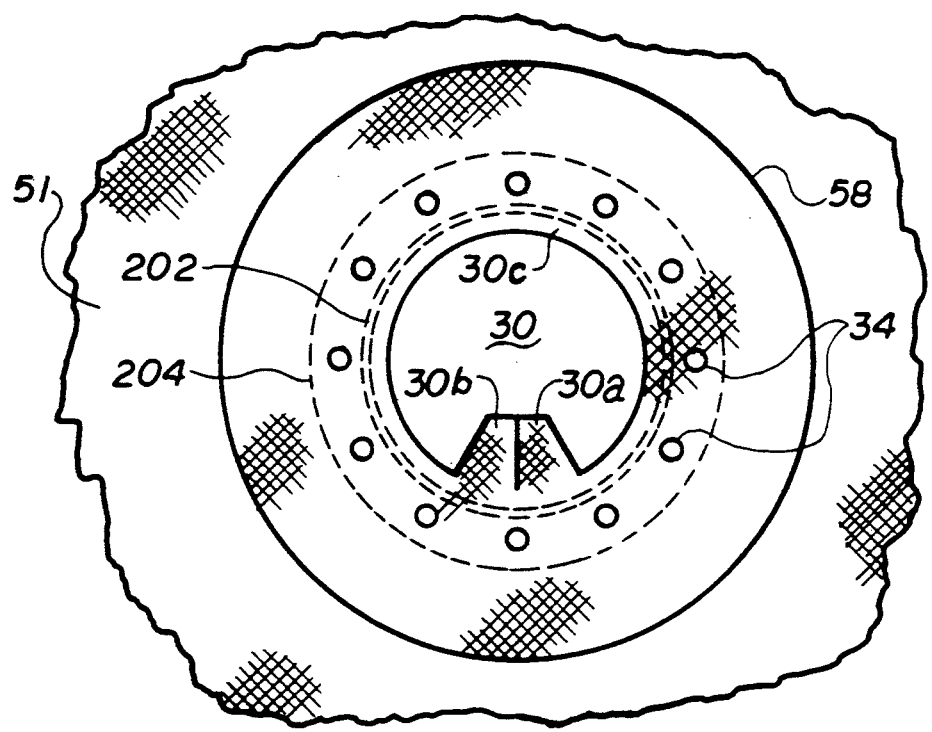

After the panels 51, 54, 55, 56 and 58 have been joined by the stitchlines 202 and 204, the fluid inlet opening 30 and the mouth 32 of the air bag 11 are formed. More particularly, the fluid inlet opening 30 and the mounting holes 34 are simultaneously cut in the five panels 51, 54, 55, 56 and 58. (See FIG. 8D.) The fluid inlet opening 30 is cut in such manner that it includes flaps 30a and 30b and an arcuate inner edge 30c. (See FIG. 8E.) As is explained in more detail in the above-identified co-pending application, the flaps 30a and 30b are located at specific sites about the perimeter of the fluid inlet opening 30 and the mounting holes 34 are positioned between stitchlines 202 and 204. The central alignment openings 66, 67, 71, and 72 may be used to insure that the fluid opening 30 and/or the mounting holes 34 are accurately formed in the intended locations.

Figure 8F:
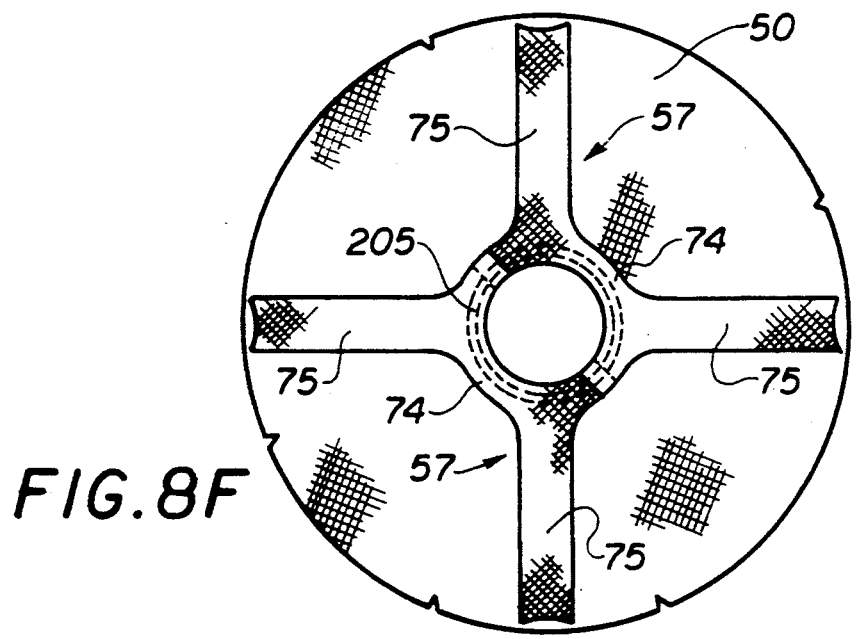

At any time during, prior to, or after the above-described joining steps, the strap panels 57 are joined to the front panel 50. Specifically, a double-stitchline 205 is used to join the semi-annular bases 74 of the panels 57 to the inner surface of the front panel 50 in such a manner that the bases together form an annular base portion. (See FIG. 8F.) Preferably, the bases 74 are sewn to a central portion of the front panel 50 and are positioned in such a manner that the straps 75 may extend outwardly from the bases in a "twelve o'clock-three o'clock-six o'clock-nine o'clock" arrangement. Although not specifically shown in the drawings, the front panel 50 and/or the strap panels 57 may include alignment notches or markings to insure that the strap panels are properly orientated relative to the front panel 51.

Figure 8G:
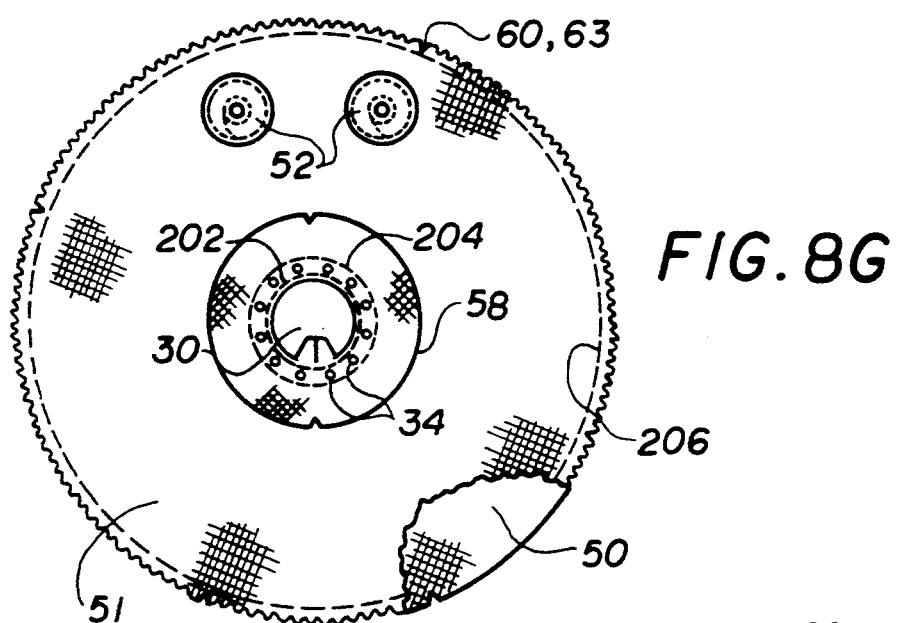

After the above-described joining steps are completed, and the fluid inlet opening 30 and the mouth 32 have been formed, the front panel 50 and the rear panel 51 are joined together. Preferably, the panels are joined by initially placing the outer surfaces of these panels together and using the alignment notches 60 and 63 to orient the panels properly relative to each other. A circular stitchline 206 is then sewn to join the aligned circumferential edges of the panels 51 and 52 together. (See FIG. 8G.) Preferably, another circular stitchline 207 is provided to "top stitch" the seam created by the stitchline 206. (See FIG. 2.) Because the panels are sewn with their outer surfaces facing each other, these panels are essentially situated in an "inside-out" arrangement.

Figure 8H:
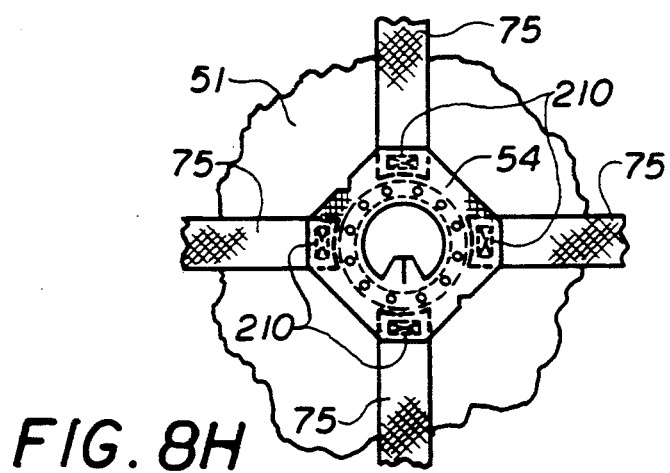

The strap panels 57 are then joined to the mouth reinforcement panels 54 and 55. In this joining step, the free end sections of the straps 75 are inserted between the unsecured "cut-off corners" of the mouth reinforcement panels 54 and 55. The free end of each of the straps 75 is positioned closely adjacent the stitchline 204. The curved shape of the free ends accommodates this positioning. As is best seen in FIG. 8H, the panels 54 and 55 are situated so that their cut-off corners are arranged in a "twelve o'clock-three o'clock-six o'clock-nine o'clock" arrangement. Each of the straps 75 is then secured to the panels 54 and 55 (but not the underlying rear panel 51 or the third mouth reinforcement panel 56) by sewing a box-stitch 210. (See FIG. 8H.)

At the completion of these joining steps, the air bag panels together form the air bag 11 in an "inside out" arrangement. The air bag 11 may be inverted by pulling the panels through the fluid inlet opening 30 thereby creating a structure capable of being inflated into the predetermined ellipsoid configuration. The air bag 11 may then be tested and inspected, and thereafter coupled to the other components of the air bag assembly 10.

One may now appreciate that the present invention provides a method of making air bags which allows at least some of the air bag panels to be formed from uncoated fabrics. The method is competitive with conventional die-cutting techniques from a production time standpoint and does not require a significant capital investment in machinery.

Although the invention has been shown and described with respect to a certain preferred embodiment, it is obvious that equivalent alterations and modifications will occur to others skilled in the art upon the reading and understanding of this specification. For example, although the above discussion addresses a particular design for a driver side air bag, the present invention may be used to make other designs of driver side air bags. Additionally, the invention may be applicable to the manufacture of passenger side air bags, including those in which various panels are integrally interwoven. Furthermore, while in the described air bag only certain panels were formed from an uncoated fabric and given fray-inhibiting contours, the invention contemplates that other and possibly all air bag panels could be produced from uncoated fabrics. The present invention includes all such equivalent alterations and modifications and is limited only by the scope of the following claims.

What is claimed is:

1. A method of making air bags for vehicle air bag assemblies comprising the steps of:

forming a set of air bag panels which includes a first panel with an outer perimetric edge and a second panel with an undulate outer perimetric edge, and joining the outer perimetric edge of the first panel to the undulate outer perimetric edge of the second panel to form a structure capable of being inflated to a predetermined three-dimensional configuration.

2. A method as set forth in claim 1 wherein said undulate outer perimetric edge of the second panel has a pinked contour.

3. A method as set forth in claim 2 wherein said undulate outer perimetric edge of the second panel has a zigzag contour of curved mountains separated by curved valleys of essentially the same size.

4. A method as set forth in claim 3 wherein a height of each mountain is approximately between one to three millimeters and a peak-to-peak distance between adjacent mountains is approximately between four to seven millimeters.

5. A method as set forth in claim 4 wherein the height of each mountain is approximately two millimeters and the peak-to-peak distance between adjacent mountains is approximately five millimeters.

6. A method as set forth in either claim 1 or claim 2 wherein said panel-forming step includes the steps of:
providing a sheet of material; and
cutting the second panel from the sheet of material in such a manner that an entirety of its undulate outer perimetric edge is simultaneously formed.

7. A method as set forth in claim 6 wherein said step of providing a sheet of material includes the step of providing a sheet of uncoated fabric.

8. A method as set forth in claim 7 wherein said cutting step includes the step of die-cutting the second panel from the sheet of material.

9. A method as set forth in claim 1 further comprising the steps of:
forming a plurality of sets of air bag panels, each set including a first panel with an outer perimetric edge and a second panel with an undulate outer perimetric edge, and
joining the outer perimetric edges of the first set of panels to the undulate outer perimetric edges of the second set of panels to form a plurality of structures each capable of being inflated to a predetermined three-dimensional configuration;
said forming step including substantially simultaneously forming the first panels and substantially simultaneously forming the second panels.

10. A method as set forth in claim 9 wherein said undulate outer perimetric edges of the second panels have pinked contours.

11. A method as set forth in either claim 9 or claim 10 wherein said panel-forming step includes the steps of:
providing a sheet of material; and
cutting the second panels from the sheet of material in such a manner that an entirety of their undulate outer perimetric edges are simultaneously formed.

12. A method as set forth in claim 11 wherein said step of providing a sheet of material includes the step of providing a sheet of uncoated fabric.

13. A method as set forth in claim 12 wherein said cutting step includes the step of die-cutting the second panels from the sheet of material.

14. A method as set forth in claim 13 wherein said die-cutting step includes the steps of:

providing a die-board with a series of knives, each knife having a geometry corresponding to the desired shape of one of the second panels and the desired contour of the perimetric edge of said one of the second panels;
loading a plurality of layers of fabric on the die board; and
applying pressure to the layers of fabric on the die board to die-cut the second panels.

15. A method of making air bags as set forth in claim 1 wherein said panel-forming step includes the step of forming the first panel in such a manner that its perimetric edge follows a straight contour.

16. A method of making air bags as set forth in claim 15 wherein said panel-forming step includes the step of forming the first panel from a coated fabric and forming the second panel from an uncoated fabric.

17. An air bag for a vehicle air bag assembly, said air bag comprising a set of panels joined together to form a structure capable of being inflated into a three-dimensional shape;
said set of air bag panels including a first panel with an outer perimetric edge and a second panel with an undulate outer perimetric edge; and
said perimetric edge of said first panel being joined with said perimetric edge of said second panel.

18. An air bag as set forth in claim 17 wherein said perimetric edge of said first panel has a straight contour.

19. An air bag as set forth in either claim 17 or 18 wherein said perimetric edge of said second panel has a pinked contour.

20. An air bag as set forth in claim 19 wherein said pinked contour includes a zigzag pattern of curved mountains separated by curved valleys of essentially the same size.

21. An air bag as set forth in claim 20 wherein a height of each mountain is approximately between one to three millimeters and a peak-to-peak distance between adjacent mountains is approximately between four to seven millimeters.

22. An air bag as set forth in claim 21 wherein said height of each mountain is approximately two millimeters and said peak-to-peak distance between adjacent mountains is approximately five millimeters.

23. An air bag as set forth in claim 19 wherein said second panel is made of an uncoated fabric.

24. An air bag as set forth in claim 23 wherein said first panel is made of a coated fabric.

25. An air bag as set forth in claim 17 wherein said first panel is a circular front panel for a driver side air bag and said second panel is circular rear panel for a driver side air bag.

26. An air bag as set forth in claim 17 wherein said set of air bag panels further includes a mouth reinforcement panel made of the same material as said second panel, said mouth reinforcement panel including an undulate outer perimetric edge.

27. An air bag for a driver side air bag assembly comprising a set of air bag panels joined together to form a structure capable of being inflated into a generally ellipsoid shape;
said set of air bag panels including a front panel which is substantially circular in shape and a rear panel which is of essentially the same shape;
said front panel being made of coated fabric and having a circumferential edge;
said rear panel being made of an uncoated fabric and having an undulate outer perimetric edge; and said circumferential edges of said front and rear panels being joined together.

28. An air bag as set forth in claim 27 wherein said perimetric edge of said front panel has a straight contour.

29. An air bag as set forth in claim 27 wherein said set of air bag panels further includes a mouth reinforcement panel made of the same material as said second panel, said mouth reinforcement panel including an undulate outer perimetric edge.

30. A method of making the air bag of claim 17, said method comprising the steps of:
   forming the set of air bag panels which includes the first panel with the perimetric edge and the second panel with the perimetric edge having undulant fray-inhibiting contour; and
   joining the air bag panels together to form the structure capable of being inflated to the predetermined three-dimensional configuration;
   said joining step including the step of joining the perimetric edge of the first panel to the perimetric edge of the second panel.

* * * * *